(12) United States Patent
Gutter

(10) Patent No.: US 11,185,063 B2
(45) Date of Patent: Nov. 30, 2021

(54) LURE RETRIEVING APPARATUS

(71) Applicant: James Gutter, Sterling, VA (US)

(72) Inventor: James Gutter, Sterling, VA (US)

( * ) Notice: Subject to any disclaimer, the term of this patent is extended or adjusted under 35 U.S.C. 154(b) by 212 days.

(21) Appl. No.: 16/674,300

(22) Filed: Nov. 5, 2019

(65) Prior Publication Data
US 2021/0127655 A1 May 6, 2021

(51) Int. Cl.
*A01K 93/00* (2006.01)
*A01K 97/06* (2006.01)

(52) U.S. Cl.
CPC .............. *A01K 97/06* (2013.01); *A01K 93/00* (2013.01)

(58) Field of Classification Search
CPC ........ A01K 97/24; A01K 93/00; A01K 97/06; A01K 85/00; A01K 97/00; A01K 99/00
See application file for complete search history.

(56) References Cited

U.S. PATENT DOCUMENTS

| 5,864,979 A | 2/1999 | Iannuccilli et al. |
| 6,305,119 B1 | 10/2001 | Kacak |
| 6,694,664 B1 | 2/2004 | Knight |
| 8,302,344 B2 | 3/2012 | Pickens |

*Primary Examiner* — Joshua J Michener
*Assistant Examiner* — Henry Hooper Mudd
(74) *Attorney, Agent, or Firm* — Patrick Stanzione; Stanzione & Associates, PLLC

(57) ABSTRACT

A floating fishing lure retriever having a arms extending at a first end from a body portion thereof and having a magnetic member connected at a second end. The arms being configured to pivot the respective second end thereof and corresponding magnetic member below the body portion by approximately four inches when the body portion is resting on either a top portion or a bottom portion thereof.

18 Claims, 5 Drawing Sheets

LURE RETRIEVING APPARATUS

COPYRIGHT NOTICE

A portion of this disclosure contains material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever. 37 C.F.R 1.71(d).

BACKGROUND OF THE INVENTIVE CONCEPT

1. Field of the Invention

The present inventive concept relates to an apparatus that retrieves floating lures that have detached from a fishing line. More specifically, the present inventive concept relates to an apparatus that retrieves floating lures that have detached from a fishing line and are significantly far away from a point where the fishing lure was originally cast.

2. Description of the Related Art

Fishing lure retrievers are well known. Typically fishing lure retrievers are used when a fishing lure that is attached to the end of a fishing line becomes snagged on some debris or other object disposed at the bottom of a body of water in which the lure is cast. Fishing lures are cast out into a body of water to sink toward the bottom of the body of water where fish can see the lure and attempt to eat the lure. Lures are designed to appear to be food for fish to eat. Lures are generally made with at least one hook extending therefrom such that once a fish attempts to eat the lure the at least one hook catches onto the fishes mouth. Once the hook engages the fish's mouth the fish can be reeled in. However, the hooks on a lure often catch onto some form of debris or other object in the water, generally at the bed of the body of water, and therefore the lure cannot be reeled in. Thus, many types of fishing lure retrievers have been designed to slide down the fishing line in which the snagged lure is attached until the retriever reaches and engages with the snagged lure. Numerous lure retrievers have different designs as to how they operate to engage with the lure at the end of the fishing line to help free the lure from the debris.

U.S. Pat. No. 5,864,979 by Iannucilli et al. discloses a fishing lure retriever 10 that includes a cap member 14 fixed to a base member 12, wherein the cap member 14 and base member 12 define a slot 18 for receiving the fishing line F and sliding along the fishing line F when the line is taut. A retriever cord 38 is then made taut and a latch 22 on the retriever 10 is designed to "anchor" on a leader 32 of the lure L. The retriever cord 38 is the supposed to be pulled, causing the lure L to give way and be pulled toward an operator of the retriever cord 38. Here the lure retriever is designed to reach a lure L under water by sliding down a fishing line in which the lure is still attached.

U.S. Pat. No. 8,302,344 by Pickens discloses a fishing lure retriever 10 that also reaches a snagged lure 12 attached to a fishing line 14 by using a longitudinal slots 22 and 36 formed therein to engage a fishing line 14 in which the lure is attached. The retriever 10 can include chains 28 to provide the retriever with sufficient weight to slide down the fishing line 14 and reach the snagged lure 12. A pair of caps 34 and 38 can be positioned to be in alignment to permit line passage therethrough and nonalignment to prevent line passage therethrough. Here the retriever 10 locks unto the fishing line 14 to pull the line, and preferably the lure 12 to disengage the lure 12 from being snagged on debris. The retriever 10 can be pulled back up by a line 32 connected thereto. However, pulling the retriever 10 back places stress on the fishing line 14, thus often causing the line 14 to break, at which point the lure 12 is lost. The fishing lure retriever 10 here is also designed to reach a lure 12 under water by sliding down a fishing line 14 in which the lure 12 is still attached.

U.S. Pat. No. 6,305,119 by Kacak discloses a fishing lure retriever 40 that utilizes a ring member 62 on a retrieval head 60 at the end of a pole 50. A lure 26 that becomes snagged under water is attached to a fishing line 22. The ring member 62 is placed around the fishing line 22 so that the ring member 62 can be lead down along the fishing line to the snagged lure 26. Once the ring member 62 reaches the lure 26, the pole 50 can be pushed forward further such that the ring member 62 will catch on the a hook 28 of the lure 26 and force the hook 28 away from the debris. The fishing lure retriever 40 here is also designed to reach a lure 26 under water by sliding down a fishing line 22 in which the lure 26 is still attached. In fact, the only way that the fishing lure retriever 40 can attempt to force the hook 28 of the lure 26 free of any debris is if the lure 26 is still attached to the fishing line 22 in which the ring 62 must encircle and slid along in order to engage with a hook 28 of the lure 26.

U.S. Pat. No. 6,694,664 by Knight discloses a fishing lure retriever in the form of a pole with a rigid loop mounter thereon. The pole lure retriever can be used to dislodge lures by exerting a force on the lure. However, this pole retriever is limited to reaching a lure within the length of the pole, and cannot easily grab onto a floating lure that has been detached from a fishing line. Moreover, users fishing from land cannot reach a lure further away than the length of the pole.

SUMMARY OF THE INVENTIVE CONCEPT

The present general inventive concept provides

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a fishing lure retriever, comprising: a body formed of a material that floats on water, the body including a front, back and sides; at least one first extension arm connected at a first end thereof to each side and the back of the body; a second extension arm flexibly connected at a first end to a second end of each of the first arm extensions; and a magnetic retriever member connected to a second end of each second extension arm and having a weight which flexes the second extension arm by an amount such that the magnetic retriever member submerges under water by approximately one to four inches when the fishing lure retriever is floating on water.

In an exemplary embodiment, the fishing lure retriever may further comprise a rotationally flexible spring-type member connected between each first extension arm and second arm extension, the spring-type member being configured to flexibly rotate in clockwise and counterclockwise directions by an amount such that the magnetic retriever member is gravitationally pulled downward by approximately one to four inches with respect to the body when the body is resting on a top or bottom side thereof.

In another exemplary embodiment, the at least one first extension arm comprises two first extension arms connected to and extending from each side of the body and one first extension arm connected to and extending from the back of the body.

In another exemplary embodiment, the body if formed of wood.

In still another exemplary embodiment, the fishing lure retriever may further comprise a flexible member connected between each first extension arm and second arm extension, the flexible member being configured to flex by an amount such that the magnetic retriever member rests approximately one to four inches below the body when the body is resting on a top or bottom thereof.

The foregoing and/or other features and utilities of the present general inventive concept may also be achieved by providing a fishing lure retriever, comprising: a body formed of a material that floats on water, the body including a front, a back and sides; at least one non-linear shaped arm rotatably connected at a first end thereof to the body and extending from each side of the body and the back of the body; and a magnetic retriever member connected to a second end of each non-linear arm and having a weight which causes the respective arm to rotate by an amount such that the magnetic retriever member submerges under water by approximately one to four inches when the fishing lure retriever is floating on water.

In an exemplary embodiment, the non-linear shaped arm is curved.

In another exemplary embodiment, the non-linear shaped arm is in the shape of the letter Z.

In still another exemplary embodiment, the fishing lure retriever may further comprise a ball bearing assembly connected to the first end of each of the at least one curved arm and embedded into the body such that each of the at least one first arm rotates about the respective ball bearing assembly.

The foregoing and/or other features and utilities of the present general inventive concept may also be achieved by providing a method of retrieving a floating fishing lure, the method comprising: providing a flotational member with at least one arm, the at least one arm having a first end connected to and extending from each side and a back portion of the body and a second end connected to a magnetic member; and connecting a pivotal member to the at least one arm such that the second end of the at least one arm pivots to a resting position approximately one to four inches below the body when the body is resting on either a top or bottom portion thereof.

In an exemplary embodiment, the pivotal member can be disposed at a middle portion of the at least one arm such that only the second end of the at least one arm and corresponding magnetic member pivot.

In another exemplary embodiment, the pivotal member is connected to the first end of the at least one arm and is embedded within the floating member such that the at least one arm pivots about the pivotal member until the second end thereof and the magnetic member rest approximately one to four inches below the body when the body is resting on either a top or bottom portion thereof.

BRIEF DESCRIPTION OF THE DRAWINGS

These and/or other features and utilities of the present inventive concept will become apparent and more readily appreciated from the following description of the embodiments, taken in conjunction with the accompanying drawings of which.

Figure 1:
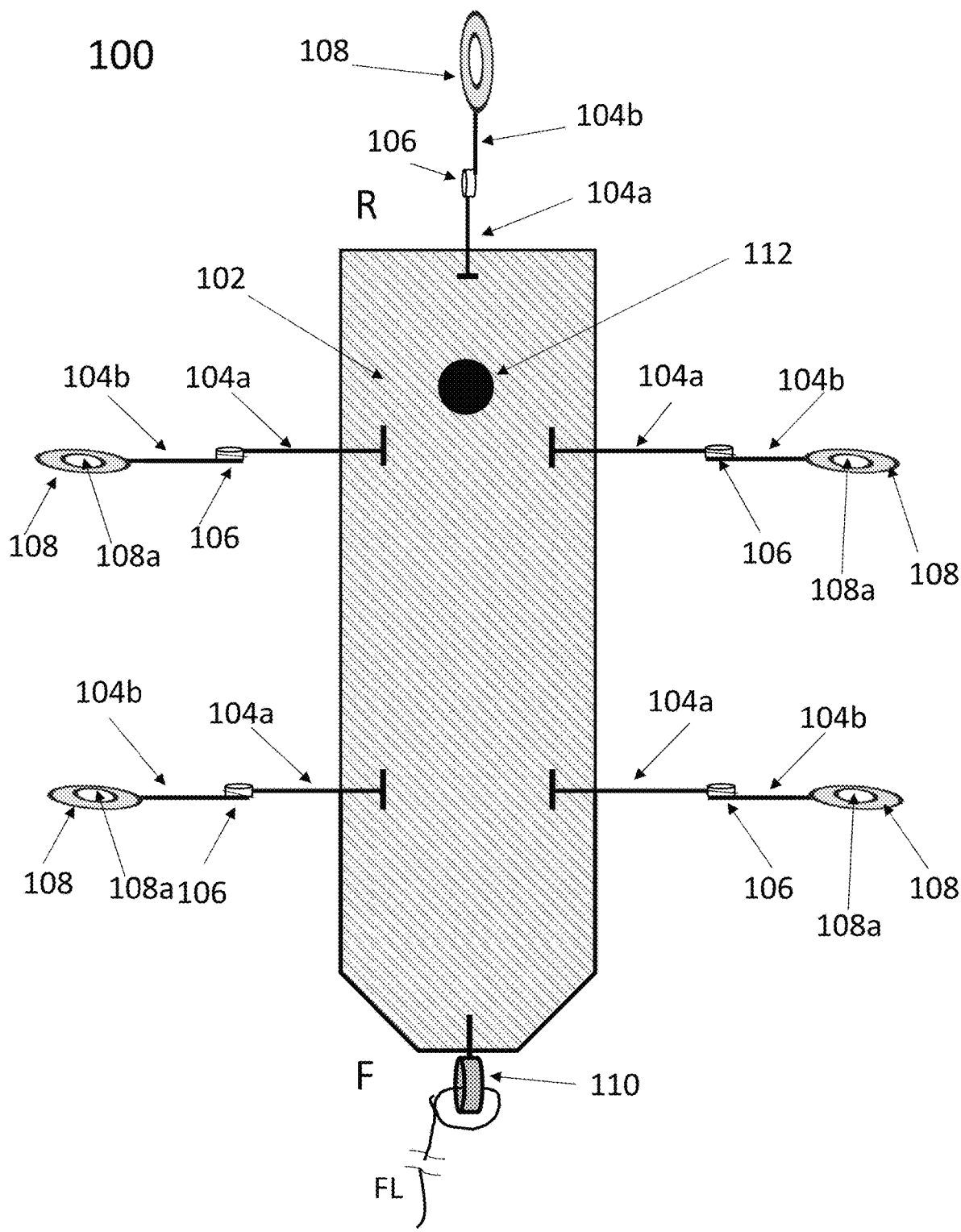
FIG. 1 illustrates a top view of a fishing lure retriever according to an exemplary embodiment of the present inventive concept.

The drawings illustrate a few exemplary embodiments of the present inventive concept, and are not to be considered limiting in its scope, as the overall inventive concept may admit to other equally effective embodiments. The elements and features shown in the drawings are to scale and attempt to clearly illustrate the principles of exemplary embodiments of the present inventive concept. In the drawings, reference numerals designate like or corresponding, but not necessarily identical, elements throughout the several views.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. Also, while describing the present general inventive concept, detailed descriptions about related well-known functions or configurations that may diminish the clarity of the points of the present general inventive concept are omitted.

It will be understood that although the terms "first" and "second" are used herein to describe various elements, these elements should not be limited by these terms. These terms are only used to distinguish one element from another element. Thus, a first element could be termed a second element, and similarly, a second element may be termed a first element without departing from the teachings of this disclosure.

Expressions such as "at least one of," when preceding a list of elements, modify the entire list of elements and do not modify the individual elements of the list.

All terms including descriptive or technical terms which are used herein should be construed as having meanings that are obvious to one of ordinary skill in the art. However, the terms may have different meanings according to an intention of one of ordinary skill in the art, case precedents, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

Also, when a part "includes" or "comprises" an element, unless there is a particular description contrary thereto, the part can further include other elements, not excluding the other elements. In the following description, terms such as "unit" and "module" indicate a unit to process at least one function or operation, wherein the unit and the block may be embodied as hardware or software or embodied by combining hardware and software.

Hereinafter, one or more exemplary embodiments of the present general inventive concept will be described in detail with reference to accompanying drawings.

Exemplary embodiments of the present general inventive concept are directed to an apparatus that retrieves floating lures that have detached from a fishing line. More specifically, the present inventive concept relates to an apparatus that retrieves floating fishing lures that have detached from a fishing line and are significantly far away from a point where the fishing lure was originally cast.

FIG. 1 illustrates a top view T (or bottom view B) of a fishing lure retriever 100 according to an exemplary embodiment of the present inventive concept. The top of bottom of the fishing lure retriever are substantially the same, and the fishing lure retriever 100 is configured to rest on either the top portion or the bottom portion thereof.

The fishing lure retriever 100 can include a body 102 which can be formed of a wood material that floats when placed in water. The body 102 can alternatively be formed of any other type of material that floats on water. In accordance with this exemplary embodiment, a plurality of first arm extensions 104a can be provided to extend from sides and a back portion of the body 102. The first arm extensions 104a can include a first end secured to and extending from the body 102 by a predetermined distance depending on the size of the fishing lure retriever 100. The size of the fishing lure retriever 100 can be larger or smaller to correspond with the size of a floating fishing lure to be retrieved.

Connected at a second end of each of the first arm extensions 104a, opposite the first end, can be a circular rotational spring-type member 106. Each spring-type member 106 is configured to rotatably flex in a clockwise and counter-clockwise direction by a predetermined amount, which is described in more detail below.

Also connected to each spring-type member 106 can be a second arm extension 104b. A first end of each second arm extension 104b can be connected to a respective rotational spring-type member 106 while a second end of each second arm extension 104b can be connected to a magnetic retriever member 108. The rotational spring-type member 106 can have a rotational movement with respect to the first arm extensions 104a such that the second arm extensions 104b rotate within an angle of substantially 160 degrees, such that the second arm extensions 104b never reach an angle of 90 degrees with respect to the first arm extensions 104a. This configuration prevents the second arm extensions 104b from being caught pointing up in the air once the fishing lure retriever 100 is cast out and lands on the top or bottom thereof. In other words, regardless of whether the fishing lure retriever 100 lands on the top or bottom thereof, each of the second arm extensions 104b will rotate downward into the water.

In accordance with an exemplary embodiment, the magnetic retriever member 108 can be circular in shape and can include a hole 108a extending through a middle portion thereof. With this configuration, the magnetic retriever member 108 can function as a multi-tasking device in that the magnetic characteristics thereof can attract and magnetically connect to any metal part of a floating fishing lure, especially a hook, thus magnetically attaching to the floating fishing lure so that the fishing lure can be reeled back in with a fishing line. Further, the central hole 108a formed in the magnetic retriever member 108 can also act as a lure hook capturing element in which a hook of a floating lure can hook into the central hole 108a, thus capturing the floating lure by using the lure's hook.

The fishing lure retriever 100 according to this exemplary embodiment can also include an eye loop 110 attached to a front end F thereof in which a fishing line FL can be tied. The eye loop 110 is provided to tie a fishing line FL thereto so that the fishing lure retriever 100 can be cast out via a fishing pole toward a detached floating lure. In other words, if a floating fishing lure is cast out on a fishing line FL and then the fishing line snaps, losing control of the floating fishing lure, additional fishing line FL can be fed out of a reel of the fishing pole and then can be tied to the fishing lure retriever 100. The fishing lure retriever 100 can then be cast out past the detached floating fishing lure and then reeled in slowly until the fishing lure retriever 100 magnetically and/or physically attaches onto the detached floating fishing lure.

In order to ensure that the fishing lure retriever 100 is heavy enough to be cast out to a distance of at least 10 yards, a weight 112 can be disposed within and towards the rear section of the body 102.

It is common for a floating fishing lure to have a back end which is partially submerged under water, while hooks extending from the floating lure can be submerged below the water surface by approximately one to four inches. Thus, the spring-type member 106 can be configured to enable a respective second arm extension 104b to have its second end, connected to a corresponding magnetic retriever member 108, flexibly move up and down with respect to the corresponding first arm extension 104a such that the magnetic retriever member 108 attached thereto becomes submerged under water by a depth of approximately one to four inches. The spring-type member 106 is further configured to allow the second end of the respective second arm extension 104b to flex/pivot below the surface of the water regardless of whether the fishing lure retriever 100 lands upright (on the bottom portion) or upside down (on the top portion) in the water after being cast out by a fishing pole. In other words, after the fishing lure retriever 100 is cast out past a detached floating fishing lure, regardless of whether the fishing lure retriever 100 lands on a top or bottom portion thereof in the water, the second end of each second arm extension 104b and the attached magnetic retriever member 108 will flex/pivot into the water to a depth of approximately one to four inches, due to a gravitational pull on the magnetic retriever member 108. Thus, the spring-type member 106 is configured to flex in two rotational directions (clockwise and counterclockwise) by a predetermined amount. The amount of flex in the spring-type member 106 can be controlled by rigidity of the spring, the thickness of the spring, or the material in which the spring is formed. Alternatively, the It is to be noted that any number of first arm extension 104a, second arm extension 104b and spring-type member 106 assemblies can be provided on the fishing lure retriever 100 which will provide the most efficient lure retriever capability with regards to the size or shape of a detached floating lure required to be retrieved. For example, a smaller size fishing lure retriever 100 with a pair of combination first arm extensions 104a, second arm extensions 104b and spring-type members 106 on each side, and one in the back, will be sufficient for smaller detached floating lures, while a larger size fishing lure retriever 100 having two or more combinations of first arm extensions 104a, second arm extensions 104b and spring-type members 106 on each side, and one in the back, will be more appropriate to capture a larger size detached floating fishing lure. In other words, the size of a fishing lure retriever 100 according to the exemplary embodiment of the present inventive concept can be provided, depending on the size and/or type of floating fishing lure that is required to be retrieved. Thus, the fishing lure retriever 100 according to the exemplary embodiments described herein can be formed of any size and shape that will provide the intended purposes herein of retrieving a detached floating lure regardless of the size, shape and material of a detached floating fishing lure.

It is also to be noted that variations in the spring-type member 106 can be provided without departing from the scope and spirit of the present inventive concept. For example, the spring-type member 106 can be substituted with a straight spring, or with a flexible rubber member with a specific elasticity coefficient to allow the second arm extension 104b to flex with respect to the first arm extension 104a such that the magnetic retriever member 108 will rest under the water by a depth of approximately one to four inches due to gravitational pull on the magnetic retriever member 108.

Figure 2A:
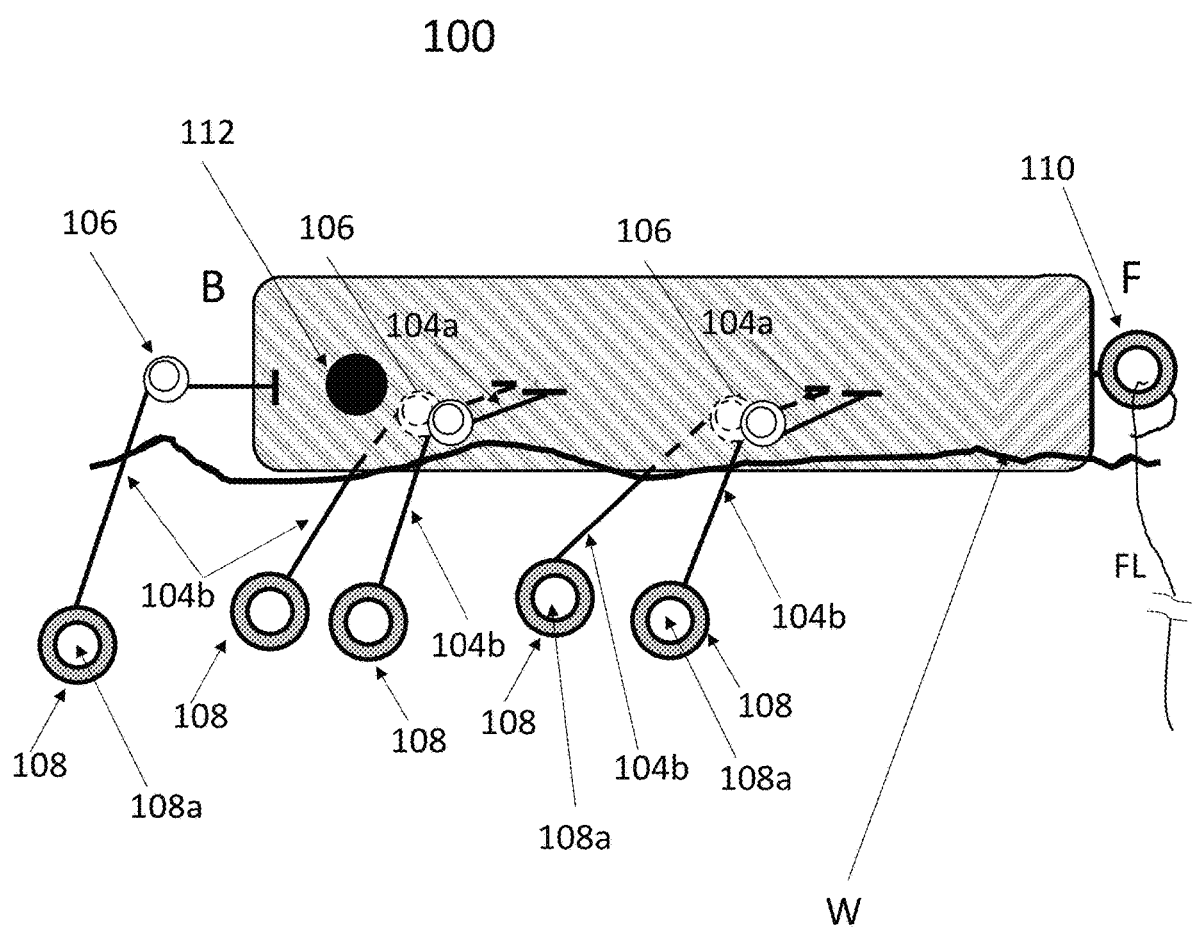
FIG. 2A illustrates a side view of the fishing lure retriever according to the exemplary embodiment of FIG. 1.

FIG. 2A illustrates a side view of the fishing lure retriever 100 according to the exemplary embodiment of FIG. 1. As illustrated, the fishing lure retriever 100 has been cast out on a fishing line FL and is in a floating position on a body of water W. Due to gravity, the magnetic retriever members 108 pull the respective second arm extensions 104b downward, thus flexing the respective spring-type members 106 such that the magnetic retriever members 108 can submerge under the water W to a depth of approximately one to four inches. It is to be noted that the spring-type members 106 can be configured to flex by an amount that allows the magnetic retriever members 108 to submerge under the water by an amount required to be approximately level with submerged hooks of a floating lure. As a result, the magnetic retriever members 108 are positioned effectively to capture a detached floating lure magnetically and/or by capturing a hook or hooks of the detached floating lure within a corresponding central hole 108a.

Figure 2B:
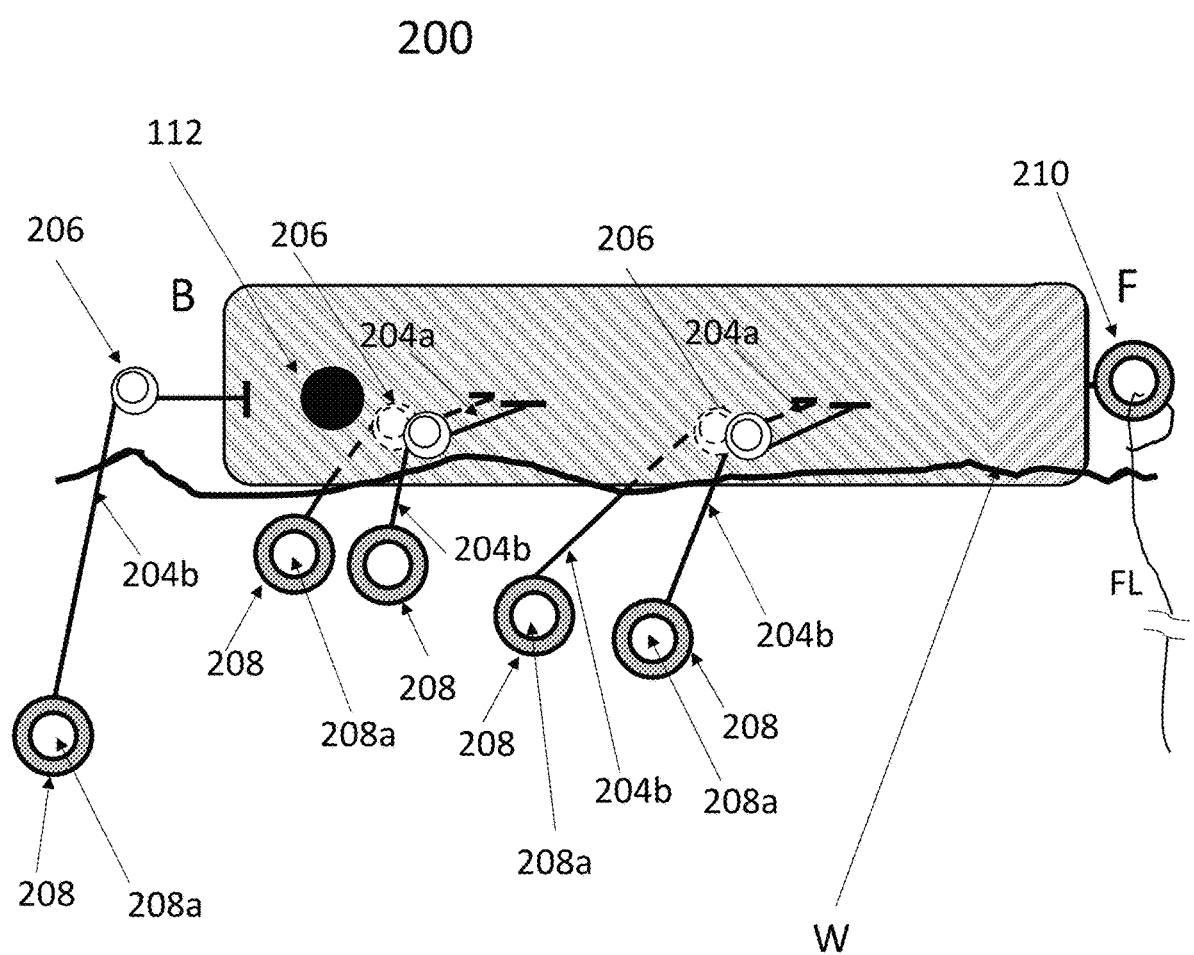
FIG. 2B illustrates a side view of a fishing lure retriever 200 according to another exemplary embodiment of the present inventive concept.

FIG. 2B illustrates a side view of a fishing lure retriever 200 according to another exemplary embodiment. Referring to FIG. 2B, magnetic retriever members 208 can be positioned at different depths between one to four inches below the water surface. With this configuration, the magnetic retriever members 208 can magnetically attach to hooks on floating lures that may be submerged below the water surface at different depths. For example, some of the magnetic retriever members 208 can be configured to rest below the water surface by one inch in order to magnetically attach to a hook of a floating lure that is submerged to a depth of approximately one inch below the water surface, while some of the magnetic retriever members 208 can be configured to rest below the water surface by two, three and four inches to magnetically attach to hooks of a floating lure that are submerged to a depth of approximately two, three or four inches below the water surface. In another exemplary embodiment, one magnetic retriever member 208 on each opposing side of the fishing lure retriever 200 can be configured to rest below the water surface by one or two inches while one magnetic retriever member 208 on each opposing side of the fishing lure retriever 200 can be configured to rest below the water surface by three inches, and one magnetic retriever member 208 disposed at the back of the fishing lure retriever 200 can be configured to rest below the water surface by four inches. With these alternative configurations of a fishing lure retriever 200 according to exemplary embodiments of the present inventive concept, magnetic retriever members 208 can be disposed to be submerged below the water surface at different depths in order to be able to magnetically attach to hooks of a floating lure that submerge to different depths below the water.

The variation in depth at which the different magnetic retriever members 208 can rest below the water surface can be provided by varying a length of the second arm extensions 204b.

Figure 3:
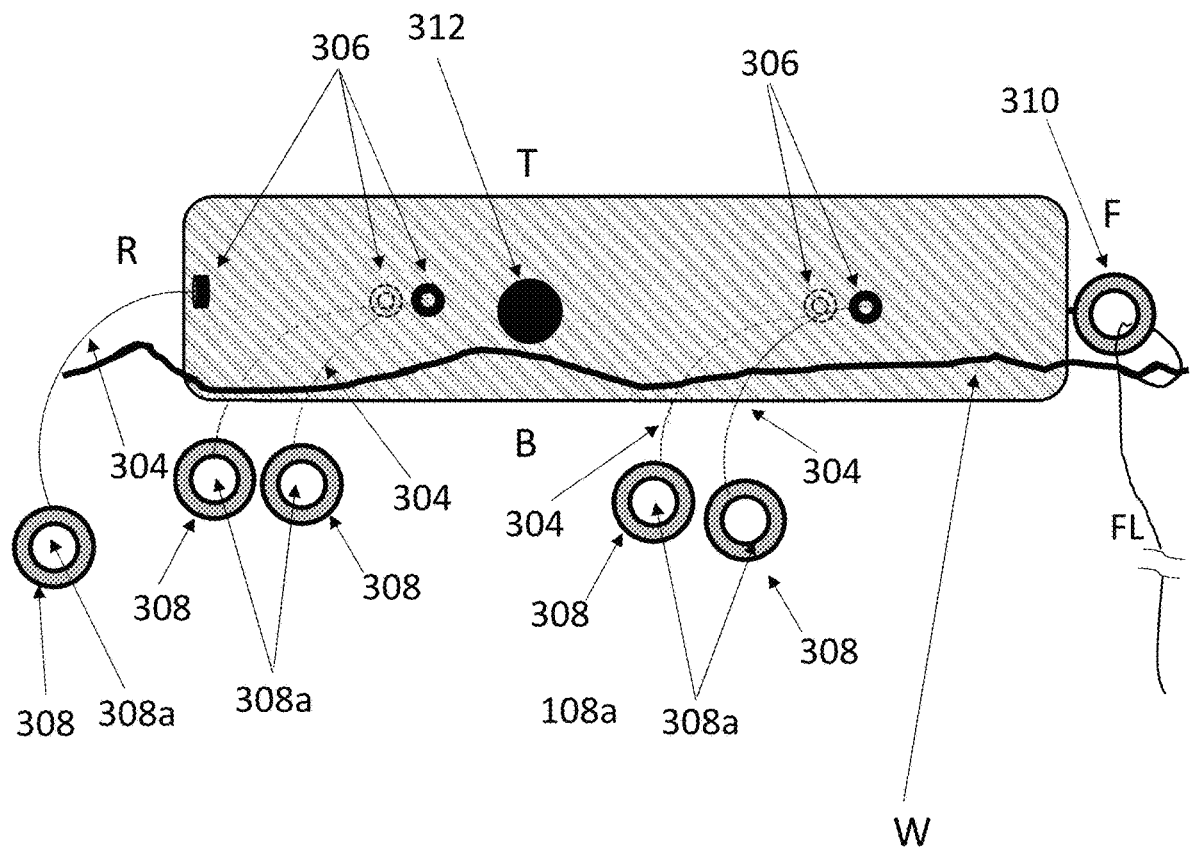
FIG. 3 illustrates a side view of the fishing lure retriever according to still another exemplary embodiment of the present inventive concept.

FIG. 3 illustrates a fishing lure retriever 300 according to another exemplary embodiment of the present inventive concept. The fishing lure retriever 300 can include a body 302 which can be formed of a wood or wood material that floats when placed in water. The body 302 can alternatively be formed of any other type of material that floats on water.

A plurality of arms 304 can include a first end rotationally secured to and extending from the body 302. The arms 304 can be curved along a length thereof and can extend outward from the body 302 as described in more detail below. The arms 304 can alternatively have a different shape that will cause a second end of the arm 304 to be pivoted downward due to a gravitational pull. For example, the arms 304 can be formed in the shape of the letter "Z."

The curved arms 304 illustrated in FIG. 3 can be connected to a corresponding ball bearing assembly 306 embedded within the body 302. More specifically, the first end of each curved arm 304 can be fixedly connected to a center portion of a corresponding ball baring assembly 306 such that regardless of whether the body 302 is resting on a top or bottom portion thereof, the weight of a corresponding magnetic retriever member 308, connected to the second end of the curved arm 304, will cause the curved arm 304 to rotate downward due to gravitational force. Thus each curved arm 304 will generally rest in a position where the second end thereof will be pointed in a downward direction with the attached magnetic retriever member 308 being positioned below the bottom B of the body 302. Accordingly, the curved arms 304 and corresponding ball bearing assembly 306 can be configured such that when the fishing lure retriever 300 is cast into a body of water W, the fishing lure retriever 300 will float on either the bottom portion B or the top portion T thereof. As the fishing lure retriever 300 floats on the water on either the top portion T or bottom portion B, the magnetic retriever members 308 will be rotate/pivot downward by gravitational force, thus causing the curved arms 304 to rotate such that the corresponding magnetic retriever member 308 will submerge under the water W by a depth of approximately 4 inches while the body 302 floats on the surface of the water W.

It is to be noted that any number of curved arms 304 with magnetic retriever members 308 can be provided on a fishing lure retriever 300 according to the exemplary embodiment, which will provide the best efficiency with regards to capturing a detached floating lure. For example, a smaller size fishing lure retriever 300 with a curved arm 304 and magnetic retriever member 308 provided on each side, and one in the back, would be sufficient for smaller detached floating lures, while a larger size fishing lure retriever 300 with two or more curved arms 304 with magnetic retriever members 308 on each side, and one in the back, would be more efficient to capture a larger size detached floating fishing lure. In other words, the size of a fishing lure retriever 300 according to this exemplary embodiment can be adjusted to include a greater number or smaller number of curved arms 304 and magnetic retriever members 308, depending on the size and/or type of floating fishing lure that is required to be retrieved. Thus, the fishing lure retriever 300 according to this exemplary embodiment can be formed of any size and shape that will provide the intended purposes herein of retrieving a detached floating lure, regardless of the size, shape and material of a detached floating fishing lure.

In order to ensure that the fishing lure retriever 300 is heavy enough to be cast out to a distance of at least 10 yards, a weight 312 can be disposed within and towards the rear section of the body 102. The weight 312 can be formed of a round lead ball, or any other type of weight that will perform the intended purposes of enhancing the distance in which the fishing lure retriever 300 can be cast outward.

Similar to the exemplary embodiment of FIG. 2B, the magnetic retriever members 308 can rotate downward to different depths between one to four inches below the water surface. With this configuration, the magnetic retriever members 308 can magnetically attach to hooks on floating lures that may be submerged below the water surface at different depths. For example, some of the magnetic retriever members 308 can be configured to rotate to a resting position below the water surface by one inch in order to magnetically attach to a hook of a floating lure that is submerged to a depth of approximately one inch below the water surface, while some of the magnetic retriever members 308 can be configured to rotate to a resting position below the water surface by two, three and four inches to magnetically attach to hooks of a floating lure that are submerged to a depth of approximately two, three or four inches below the water surface. In another exemplary embodiment, one magnetic retriever member 308 on each opposing side of the fishing lure retriever 300 can be configured to rotate to a resting position below the water surface by one or two inches while one magnetic retriever member 308 on each opposing side of the fishing lure retriever 300 can be configured to rest below the water surface by three inches, and one magnetic retriever member 308 disposed at the back of the fishing lure retriever 300 can be configured to rotate to a resting position below the water surface by four inches. With these alternative configurations of a fishing lure retriever 300 according to exemplary embodiments of the present inventive concept, magnetic retriever members 308 can be configured to rotate to a resting position below the water surface at different depths in order to be able to magnetically attach to hooks of a floating lure that submerge to different depths below the water.

Figure 4:
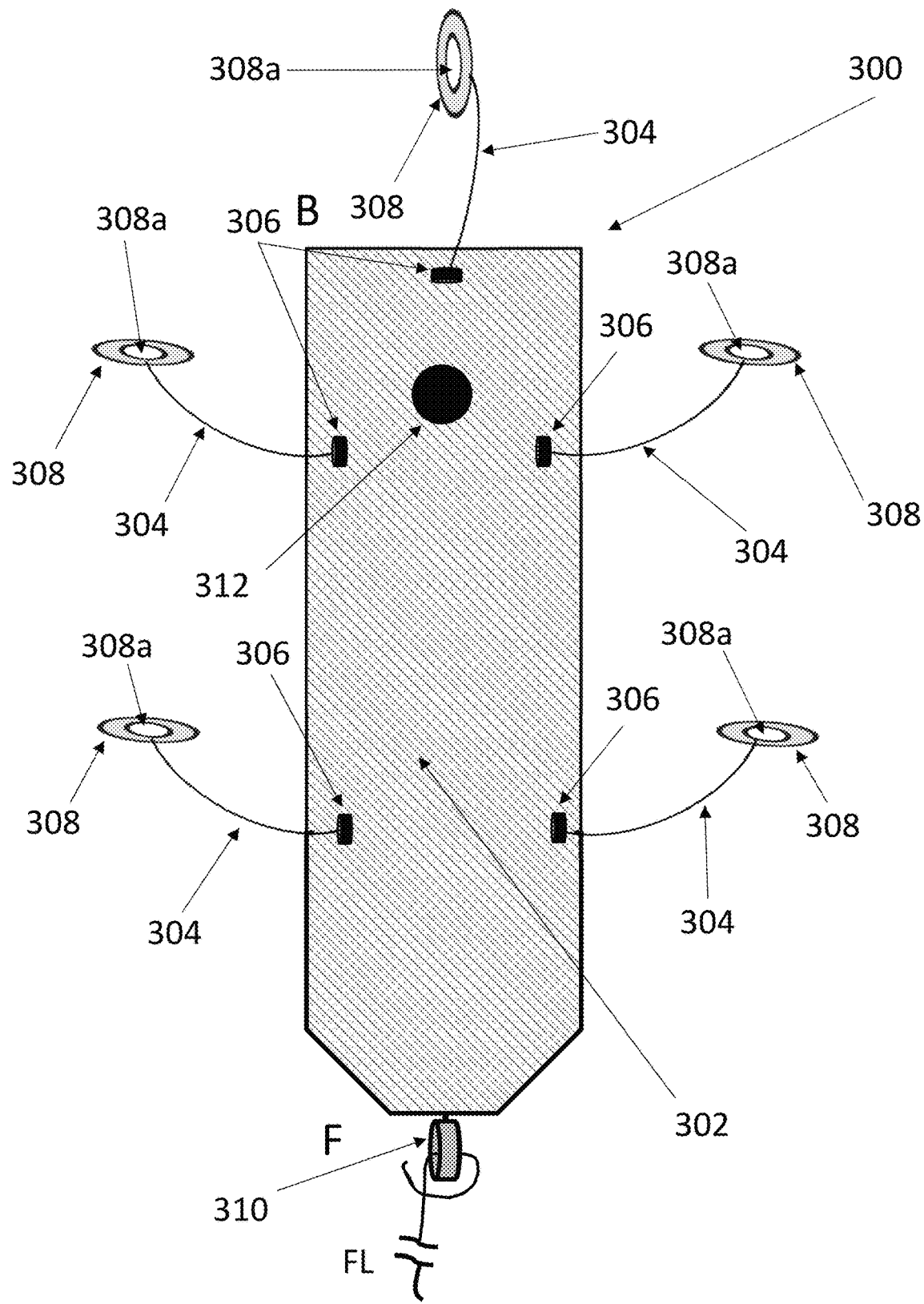
FIG. 4 illustrates a top (or bottom) view of the fishing lure retriever according to the exemplary embodiment of FIG. 3.

FIG. 4 illustrates a top view (or bottom view) of the fishing lure retriever 300 according to the exemplary embodiment of FIG. 3. As illustrated, the curved arms 304 extend from a first end thereof outward from a corresponding ball bearing assembly 306 embedded within the body 302 at an angle substantially perpendicular from the body 302 and the corresponding ball bearing assembly 306. Each of the arms 304 are shaped in an arc like curve and have a corresponding magnetic retriever member 308 attached thereto at a second end thereof. The once the body 302 of the fishing lure retriever 300 lands in the water W, the body 302 will either be floating on its top side T or the bottom side B. Accordingly, the weight of each magnetic retriever member 308 will cause the respective curved arm 304 to rotate about the respective ball bearing assembly 306 until the magnetic retriever member 308 becomes submerged under the water due to the gravitational pull. Each of the curved arms 304 and respective magnetic retriever member 308 will extend outward and down into the water such that magnetic retriever members 308 will be submerged to a level that is substantially the level at which hooks of a floating lure will be submerged. Thus, the magnetic retriever members 308 will be capable of magnetically attracting to and attaching to hooks of a floating lure that are closest to the magnetic retriever members 308.

As the fishing lure retriever 300 is reeled in on a fishing line FL, the fishing lure retriever 300 can be guided to a detached floating lure such that the magnetic retriever members 308 can magnetically and/or physically grab hold of the detached floating fishing lure and be reeled in and retrieved.

It is to be noted that variations of the types and shapes of the arms, magnetic retriever members and flexible members can be provided without departing from the scope and spirit of the present inventive concept. The magnetic retriever members can be of any shape or design that will provide the greatest chances of attaching to a free floating lure and holding on so that the free floating lure can be retrieved and reeled back to the user.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A fishing lure retriever, comprising:
   a body formed of a material that floats on water, the body including a front, back and sides;
   at least one first extension arm connected at a first end thereof to each side and the back of the body;
   a second extension arm flexibly connected at a first end to a second end of each of the first arm extensions; and
   a magnetic retriever member connected to a second end of each second extension arm and having a weight which flexes the second extension arm by an amount such that the magnetic retriever member submerges under water to a predetermined depth when the fishing lure retriever is floating on water.

2. The fishing lure retriever according to claim 1, further comprising:
   a rotationally flexible spring-type member connected between each first extension arm and second arm extension, the spring-type member being configured to flexibly rotate in clockwise and counterclockwise directions by an amount such that the magnetic retriever member is gravitationally pulled downward by approximately one to four inches with respect to the body when the body is resting on a top or bottom side there.

3. The fishing lure retriever according to claim 2, wherein the at least one first extension arm comprises two first extension arms connected to and extending from each side of the body and one first extension arm connected to and extending from the back of the body.

4. The fishing lure retriever according to claim 2, wherein the body if formed of wood.

5. The fishing lure retriever according to claim 1, further comprising:
   a flexible member connected between each first extension arm and second arm extension, the flexible member being configured to flex by an amount such that the magnetic retriever member rests approximately one to four inches below the body when the body is resting on a top or bottom thereof.

6. The fishing lure retriever according to claim 1, wherein some of the magnetic retriever members submerge to different depths below the water surface with respect to each other.

7. The fishing lure retriever according to claim 6, wherein pairs of the magnetic retriever members on opposite sides thereof submerge to a different depth below the water surface with respect to other pairs of magnetic retriever members on opposite sides thereof.

8. The fishing lure retriever according to claim 7, wherein two opposing magnetic retriever members submerge to a depth of two inches below the water surface, two opposing magnetic retriever members submerge to a depth of three inches below the water surface, and the second extension arm extending from the back of the fishing lure retriever and corresponding magnetic retriever member submerge to a depth of four inches below the water surface.

9. A fishing lure retriever, comprising:
- a body formed of a material that floats on water, the body including a front, a back and sides;
- at least one non-linear arm rotatably connected at a first end thereof to the body and extending from each side of the body and the back of the body; and
- a magnetic retriever member connected to a second end of each non-linear arm and having a weight which causes the respective arm to rotate by an amount such that the magnetic retriever member submerges under water by a predetermined amount when the fishing lure retriever is floating on water.

10. The fishing lure retriever according to claim 9, further comprising:
- a ball bearing assembly connected to the first end of each of the at least one arm and embedded into the body such that each of the at least one first arm rotates about the respective ball bearing assembly.

11. The fishing lure retriever according to claim 10, wherein the non-linear arm is formed in a curve shape.

12. The fishing lure retriever according to claim 10, wherein the non-linear arm is formed in the shape of the letter Z.

13. The fishing lure retriever according to claim 9, wherein some of the magnetic retriever members submerge to different depths below the water surface with respect to each other.

14. The fishing lure retriever according to claim 13, wherein the magnetic retriever members submerge to a different depth below the water surface with respect to each other.

15. The fishing lure retriever according to claim 14, wherein two opposing magnetic retriever members submerge to a depth of two inches below the water surface, two opposing magnetic retriever members submerge to a depth of three inches below the water surface, and the second extension arm extending from the back of the fishing lure retriever and corresponding magnetic retriever member submerge to a depth of four inches below the water surface.

16. A method of retrieving a floating fishing lure, the method comprising:
- providing a flotational member with at least one arm, the at least one arm having a first end connected to and extending from each side and a back portion of the body and a second end connected to a magnetic member;
- connecting a pivotal member to the at least one arm such that the second end of the at least one arm pivots to a resting position approximately four inches below the body when the body is resting on either a top or bottom portion thereof.

17. The method according to claim 16, wherein the pivotal member is disposed at a middle portion of the at least one arm such that only the second end of the at least one arm and corresponding magnetic member pivot.

18. The method according to claim 16, wherein the pivotal member is connected to the first end of the at least one arm and is embedded within the floating member such that the at least one arm pivots about the pivotal member until the second end thereof and the magnetic member rest approximately four inches below the body when the body is resting on either a top or bottom portion thereof.

* * * * *